United States Patent [19]

Engelhardt et al.

[11] Patent Number: 4,736,014

[45] Date of Patent: Apr. 5, 1988

[54] WATER-SOLUBLE POLYCOESTERS, PROCESS FOR THEIR PREPARATION, AND THEIR USE

[75] Inventors: Friedrich Engelhardt; Karl Hintermeier, both of Frankfurt am Main; Rolf Kleber, Neu-Isenburg; Peter Klein, Wiesbaden, all of Fed. Rep. of Germany

[73] Assignee: Cassella Aktiengesellschaft, Leverkusen am Main, Fed. Rep. of Germany

[21] Appl. No.: 2,815

[22] PCT Filed: May 17, 1985

[86] PCT No.: PCT/EP85/00233

§ 371 Date: Jan. 13, 1987

§ 102(e) Date: Jan. 13, 1987

[87] PCT Pub. No.: WO86/06735

PCT Pub. Date: Nov. 20, 1986

[51] Int. Cl.⁴ .................. C08G 63/68; C08G 75/00
[52] U.S. Cl. ..................... 528/295; 528/272; 528/275
[58] Field of Search .............. 528/272, 275, 295

[56] References Cited

U.S. PATENT DOCUMENTS

| | | | |
|---|---|---|---|
| 4,104,262 | 8/1978 | Schade | 528/295 |
| 4,167,395 | 9/1979 | Engelhardt et al. | 8/173 |
| 4,215,026 | 7/1980 | Login | 528/295 |
| 4,250,296 | 2/1981 | Weckler et al. | 528/295 |
| 4,427,557 | 1/1984 | Stockburger | 528/295 |

*Primary Examiner*—Lucille M. Phynes
*Attorney, Agent, or Firm*—Connolly and Hutz

[57] ABSTRACT

Polycoester of the formula I

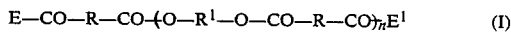

in which

R is 60 to 85 mol % 1,3-phenylene radicals, 5 to 20 mol % tetramethylene radicals and 10 to 20 mol % for example radicals of the formula IIa

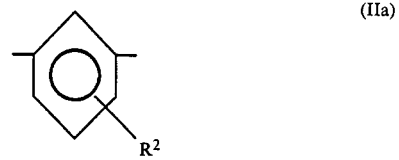

$R^1$ is 60 to 95 mol % ethylene radicals ($-CH_2CH_2-$), 0 to 28 mol % 2,2-dimethyl-1,3-propylene radicals and 5 to 12 mol % polyoxyethylene radicals having an average molecular weight up to 600 and $R^2$ denotes for example $SO_3H$ and E, $E^1$ denote for example $-OH$ and n is a sufficiently large number that the polycoester has an average molecular weight between 15,000 and 40,000, are used in the form of their aqueous solutions as sizing agents.

11 Claims, No Drawings

WATER-SOLUBLE POLYCOESTERS, PROCESS FOR THEIR PREPARATION, AND THEIR USE

Polyesters and their preparation by condensing glycols with dicarboxylic acids and dicarboxylic acid esters have already been described in large number and have in some instances become widely established. For instance, polyesters which are essentially obtained from terephthalic acid and ethylene glycol are used as fiber material.

It is also already known to prepare, by methods analogous to those for preparing acid-modified polyacrylonitrile fibers, acid-modified polyester fibers which can be dyed easily and in deep shades with basic dyes. For instance, U.S. Pat. Nos. 3,018,272, 3,164,566, 3,164,567 and 3,166,531 describe fiber-forming polycoesters which contain in the molecule a small amount of randomly distributed sulfo groups which are bonded to phenyl nuclei. Such products can be obtained for example by replacing a small portion of the dicarboxylic acid used by sulfoterephthalic acid or sulfoisophthalic acid.

The abovementioned polyesters are insoluble in water. Also already known are water-soluble or readily water-dispersible polyesters which are used for example as sizing agents for polyester yarns.

The processing of textile threads into textile material by weaving is only possible in practice if the warp yarn is treated before weaving with a sizing agent which has the function of conferring greater smoothness, suppleness, resistance and cohesion on the threads under the high mechanical stresses of weaving and hence of facilitating the weaving process and of reducing thread breakages and thread abrasion. In addition to the properties mentioned, a good sizing agent must also have a number of other specific properties, so that its use does not lead to production problems. For example, the sizing agent must not leave a tacky deposit on metallic yarn guides; the sized yarn should have a very low metal friction and not stick to other sized yarns or to apparatus parts. The sizing agent should be sufficiently soluble in water, and the ready-to-use aqueous solution must not form a skin, since this skin leads to stubborn soiling of the yarns and unpleasant production problems. The solution must remain homogeneous for a long time, so that no inadmissible concentration fluctuations arise, and the stability of the solution must even be retained in the presence of spin finishes which are inevitably carried over into the sizing baths in the course of sizing spin-finished yarns. (Spin finishes are indispensable for trouble-free spinning and therefore are present on all spun synthetic fibers.) It is also particularly important that after weaving the textile material can be completely freed from the sizing agent by simply rinsing or washing, since this is a prerequisite for trouble-free further processing, such as, for example, dyeing.

The sizing agents used are increasingly products based on polycoesters. Austrian Pat. No. 229,040 discloses polycoesters from dicarboxylic acids, polyalkylene glycols having a molecular weight of above 6000 and polyfunctional, aliphatic alcohols, which are swellable or even soluble, up to a certain degree, in water. These products are supposed to be used, inter alia, as sizing agents. However, when used in this way these products do not produce the desired high yarn cohesion and are incompatible with customary spin finishes. They further have the disadvantage that they are not easily dissolved. Moreover, solutions of these products have extremely high viscosities even at very low concentrations.

German Auslegungsschrift No. 1,816,163 describes a process for preparing water-soluble linear polyesters, wherein (a) dicarboxylic acids, (b) diols and (c) dicarboxylic acids or diols with in each case a sulfonyl or sulfonate radical of an aromatic ring are condensed to an intrinsic viscosity of at least 0.3, at least 20 mol % of the diol component (b) consisting of a certain polyethylene glycol, and component (c) accounting for 8 to 45 mol % of the dicarboxylic acid or diol component. The polyesters are used as sizing agents.

German Pat. No. 2,438,379 discloses water-soluble or readily water-dispersible polycoesters in which the dicarboxylic acid radicals are 26 to 90 mol % phenylene radicals, 10 to 25 mol % radicals of 4- or 5-sulfopropoxyisophthalic acid or sulfopropoxyterephthalic acid and 0 to 49 mol % alkylene radicals having 1 to 6 C atoms and/or cyclohexylene radicals and the diol radicals are 51 to 100 mol % diethylene glycol radicals, 0 to 49 mol % alkylene radicals having 2 to 6 C atoms or radicals of the formula $-CH_2-CH(CH_3)-O-CH_2-CH(CH_3)-$, 0 to 20 mol % polyoxyethylene radicals having an average molecular weight of 116 to 600 and 0 to 10 mol % polyoxyethylene radicals having an average molecular weight of 600 to 2000. These polycoesters, which have an apparent average molecular weight between 1000 and 3000 are used as sizing agents for polyester spun yarns and polyester filament yarns.

It has now been found, surprisingly, that the polycoesters according to the invention have, compared with the previously disclosed sizing agents based on polycoesters, further improved sizing properties and improved handling properties. For instance, they have for example a lower tackiness and a higher elasticity of the size films, which effects a higher bending stiffness of the sized yarns, require a lower total addon, form no skin on standing, are not precipitated on dilution even with hard tap water, and are readily removed from the sizing trough and from the sized material.

The invention relates to water-soluble polycoesters having a flow point between 220° and 280° C. of the general formula I $$E-CO-R-CO+O-R^1-O-CO-R-CO)_nE^1 \qquad (I)$$

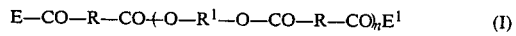

in which

R is on average 60 to 85 mol % 1,3-phenylene radicals, 5 to 20 mol % tetramethylene radicals and 10 to 20 mol % radicals of the formula IIa and/or IIb

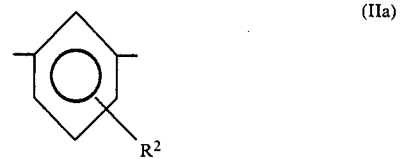

(IIa)

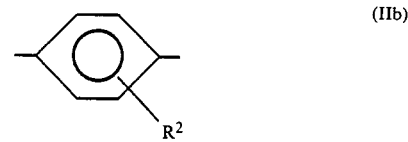

(IIb)

$R^1$ is on average 60 to 95 mol % ethylene radicals ($-CH_2CH_2-$), 0 to 28 mol % of 2,2-dimethyl-1,3-propylene radicals and 5 to 12 mol % polyoxyethylene radicals having an average molecular weight up to 600 and R² =SO₃M or —OCH₂CH₂CH₂SO₃M, E, E¹=—OM, alkoxy having 1 to 4 C atoms or the radical —O—¹—OH, M denotes a proton, an alkali metal cation or an ammonium ion and n is a sufficiently large number for the polycoester to have an average molecular weight between 15,000 and 40,000.

The invention also relates to a process for preparing the polyesters and to their use as sizing agents.

Preferred polycoesters are those in which R is on average 60 to 80 mol % of 1,3-phenylene radicals, 10 to 20 mol % of tetramethylene radicals and 10 to 20 mol % of radicals of the formula IIa.

Further preferred polycoesters are those in which R¹ is on average 68 to 90 mol % ethylene radicals (—CH₂—CH₂—), 5 to 20 mol % of 2,2-dimethyl-1,3-propylene radicals and 5 to 10 mol % polyoxyethylene radicals having an average molecular weight up to 600.

Preference is also given to polycoesters having a molecular weight between 20,000 and 40,000. The polycoesters according to the invention preferably have a flow point between 230° and 270° C. Very particularly preferred polycoesters are those which have more than one or in particular all the preferred features mentioned.

The 1,3-phenylene radicals incorporated for R in the polycoester are radicals of isophthalic acid; the tetramethylene radicals incorporated for R are radicals of adipic acid; the radicals of the formulae IIa and IIb incorporated for R are radicals of isophthalic and terephthalic acids which are substituted in the nucleus by a sulfo group or a sulfopropoxy group, if desired in the form of an alkali metal or ammonium salt.

The ethylene radicals incorporated for R¹ in the polycoester are radicals of ethylene glycol; the 2,2-dimethyl-1,3-propylene radicals incorporated for R¹ are radicals of neopentylglycol (=2,2-dimethylpropane-1,3-diol). The polyoxyethylene radicals with an average molecular weight up to 600 which are incorporated for R¹ have the formula III

—CH₂CH₂O—(CH₂CH₂O)ₘ̄ CH₂CH₂— (III)

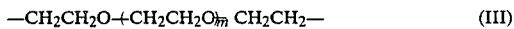

and are derived from polyethylene glycols of the formula IV

HOCH₂CH₂O—(CH₂CH₂O)ₘ̄ CH₂CH₂OH (IV)

where m is a number from 0 to 12, so that an average molecular weight up to about 600 results for the radicals of the formula III and the compounds of the formula IV. Polyethylene glycols of the formula IV are commercially available for example in the form of diethylene glycol, triethylene glycol, tetraethylene glycol and higher polyethylene glycols having average molecular weights of 300, 400 and 600 (abbreviated to PEG 300, PEG 400, PEG 600). The fact that an average molecular weight is specified indicates that the polyethylene glycols, like other high polymer substances, and for example like the polycoesters according to the invention, are not completely uniform compounds, but are mixtures of very similar polymer homologs. For example, a commercially available polyethylene glycol 400 contains polymer homologs having molecular weights of 380 to 420. Owing to this range of variation, it also appears to be admissible to specify the same molecular weight for a radical of the formula III, which is derived from a polyethylene glycol of the formula IV with a certain value for m, although theoretically the radical III has a molecular weight lower by 34.

In the polycoesters according to the invention, the radicals R¹ can also be radicals of different polyethylene glycols in random distribution. For example, 10 mol % of the radicals R¹ can consist of 5 mol % of radicals of PEG 400 and 5 mol % of PEG 600; or for example 10 mol % of the radicals R¹ can consist of 3 mol % of radicals of diethylene glycol, 3 mol % of radicals of triethylene glycol and 4 mol % of radicals of PEG 400.

The radicals E and E¹ can have the same meaning or different meanings. M denotes a proton, the ammonium ion, an alkali metal cation, such as, for example, the lithium, sodium or potassium ion. M is preferably the sodium cation.

The total of the dicarboxylic acid radicals R present in the polycoesters according to the invention is 100 mol %. The sum of the diol radicals R¹, relative to the sum of the radicals R, is 100 to 105 mol %.

The polycoesters according to the invention are prepared by esterifying or transesterifying 100 mol % of a dicarboxylic acid component comprising 60 to 85 mol %, preferably 60 to 80 mol % of isophthalic acid and/or its lower alkyl esters, 5 to 20 mol %, preferably 10 to 20 mol %, of adipic acid and/or its lower alkyl esters, and 10 to 20 mol % of an isophthalic acid of the formula Va which is substituted in the nucleus by R³ and/or of a terephthalic acid which is substituted in the nucleus by R³ and is of the formula Vb

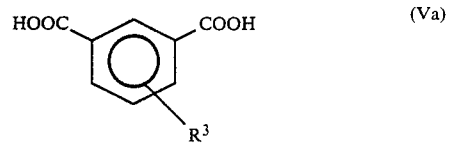

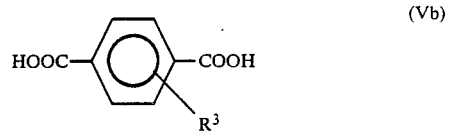

in which R³ denotes —SO₃M¹ or —OCH₂CH₂CH₂SO₃M¹ and M¹ denotes an alkali metal cation, and/or their lower alkyl esters, preferably 10 to 20 mol % of the isophthalic acid of the formula Va and its lower alkyl esters, with (relative to 100 mol % of dicarboxylic acid component) 120 to 265 mol %, preferably 140 to 230 mol %, of a diol component comprising (relative to 100 mol of dicarboxylic acid component) 115 to 225 mol %, preferably 130 to 190 mol %, of ethylene glycol, 0 to 28 mol %, preferably 5 to 25 mol %, of neopentylglycol and 1 to 12 mol %, preferably 5 to 10 mol %, of one or more polyethylene glycols of the formula IV at temperatures up to 200° C., preferably 235° C., and then polycondensing at temperatures up to 300° C. until the polycoester formed has an average molecular weight of 15,000 to 40,000, preferably 20,000 to 40,000.

The alkali metal cation M¹ is for example a potassium cation, but preferably the sodium cation.

The statement "120 to 265 mol % of a diol component" and the mole percentages for the components of the diol component are relative to the 100 mol % of the dicarboxylic acid component. Preferably 140 to 230 mol % of the diol component, based on 100 mol % of the dicarboxylic acid component, are used in the preparation of the polycoesters. It is clear from the numerical data that the diol component is used in excess. The excess of the diol component is due to excess ethylene glycol, which distills off largely unchanged in the course of condensation and can be regenerated.

Suitable monomers of the dicarboxylic acid component are in addition to isophthalic acid and adipic acid the monoalkali metal salts, in particular the monosodium salts, of 4-sulfoisophthalic acid, 5-sulfoisophthalic acid, 4-sulfopropoxyisophthalic acid, 5-sulfopropoxyisophthalic acid, 2-sulfoterephthalic acid and 2-sulfopropoxyterephthalic acid, and the esters of the dicarboxylic acids mentioned with lower alcohols, i.e. with alcohols having 1 to 4 C atoms.

The diol component comprises ethylene glycol, as a rule neopentyl glycol, and one or more polyethylene glycols of the formula IV.

The preparation of the polycoesters proceeds in two phases. In the first reaction phase the compounds of the dicarboxylic acid component are only esterified or transesterified with the compounds of the diol component, and in the second reaction phase the resulting esters are polycondensed. The reactions are generally carried out in both phases with stirring.

It is advantageous to carry out the esterification or transesterification, which is carried out in the first phase between the dicarboxylic acid component and the diol component, in the atmosphere of an inert gas, such as, for example, nitrogen. The presence of a suitable esterification or transesterification catalyst is also advantageous. Suitable catalysts are for example alkali metal hydroxides, such as sodium or potassium hydroxide, or alkali metal alcoholates, such as sodium methylate or ethylate, alkaline earth metal oxides or hydroxides, such as, for example, the corresponding calcium or magnesium compounds, and further also zinc oxide, cadmium oxide, salts of organic carboxylic acids, such as sodium acetate, calcium acetate, manganese acetate or zinc acetate or formate, organic titanium compounds, preferably titanium alcoholates, such as, for example, in particular titanium isopropylate or titanium butylate. The amounts to be used depend in particular on the activity of the specific catalyst.

The amount of catalyst is normally kept as low as possible. Acid catalysts are less suitable, since they convert the ethylene glycol used into dioxane and hence largely prevent the ethylene glycol from taking part in the chain formation reactions. Since this side reaction can even take place as a result of a small degree of dissociation of the sodium sulfonate salts, additional buffering, for example with a little alkali metal acetate, such as, for example, sodium acetate, or alkali metal alcoholate, such as, for example, sodium methylate, is advisable even in the case of use of neutral catalysts, such as, for example, titanium alcoholates. In the esterification or transesterification phase the reaction mixture is heated to temperatures up to 200° C., preferably 235° C., and water and/or lower alcohols escape as distillate. The amount of distillate collected can be used to monitor the course of the esterification or transesterification.

At the end of the first reaction phase there is present a mixture of esters in which the esters predominantly consist of a radical of a dicarboxylic acid and two radicals of a diol. This mixture of esters is polycondensed in the second reaction phase to a polycoester. To this end, the reaction mixture is preferably heated in an inert gas, such as nitrogen, to temperatures higher than in the first reaction phase, generally to temperatures of 210°0 to 300° C., preferably of 260° to 285° C., and is then polycondensed under a reduced pressure of, for example, 0.1 to 50 mbar until an average molecular weight of 15,000 to 40,000, preferably 20,000 to 40,000, is obtained. Advantageously this pressure is reduced first to about 10 to 15 mbar and after some time to 0.5 to 5 mbar. The polycondensation can be carried out without or preferably with a catalyst. Suitable condensation catalysts are for example antimony trioxide with or without the addition of a little phosphorous acid.

During the polymerization, the bisglycol esters in particular eliminate ethylene glycol, partly in the form of decomposition products. Of the dicarboxylic acid component, 100 mol % of radicals are incorporated in the polycoester; of the diol component compounds used, however, only between 100 and 105 mol % of radicals are incorporated in the polycoester, including virtually all radicals of the starting polyethylene glycol of the formula IV.

The esterification or transesterification phase and the condensation phase are not always easy to separate from each other, but they frequently merge into each other. The transesterification or esterification phase can also be complete even at temperatures of 170° to 200° C. The condensation phase then begins at the adjoining upper temperatures.

It is usually advantageous to use at the start of the esterification or transesterification phase not the whole but only the esterified part of the dicarboxylic acid component and to add the unesterified remainder of the dicarboxylic acid component toward the end or after the esterification or transesterification has ended, i.e. for example when the temperature is raised above 170° to 200° C.

The condensation phase can frequently be completed at maximum temperatures of 260° to 285° C., but in some cases can also be completed at maximum temperatures of 240° to 260° C.

The average molecular weight is calculated after the end group analysis by the following formula $$\text{average molecular weight} = \frac{112{,}200}{\text{acid number} + \text{hydroxyl number}}.$$

When the specified average molecular weight is reached, the polycoester has a flow point of 220° to 280° C., preferably 230° to 270° C. (The method used for determining the flow point is given in Example 1). However, at the specified flow points the polycoesters according to the invention are certainly not highly mobile. For instance, a polycoester condensed to completion at 280° C. in a glass flask can be inverted in the flask at the stated temperature without exhibiting significant flow.

To determine the average molecular weight during the condensation it is not always necessary to carry out acid number and hydroxyl number determinations, since it will normally also be possible to monitor the degree of condensation after prior calibration, from the course of ancillary parameters, for example the viscosity. The viscosity in turn can be measured for example in terms of the resistance which the stirrer is subjected to in the course of its rotation in the reaction vessel.

After the polycondensation has ended, the polycoesters are obtained in the form of pale, slightly yellow or slightly amber-colored melts which, while they are still warm and in liquid form or after solidification and comminution, are readily soluble in water. As a rule the pH value of the solutions is set with a little alkali metal hydroxide solution, for example sodium hydroxide or potassium hydroxide solution, or with ammonia solution to approximately the neutral point. In this adjustment of the pH value, protons still present in the polycoester are replaced by alkali metal cations or ammonium ions. Polycoesters which are free of alkali metal cations can be obtained by treating an aqueous solution of the polycoester with a cation exchanger in the acid form and using the solution further or, if desired, evaporating it to isolate the polycoesters. The aqueous solutions obtained are, if appropriate after removal of slight turbidities by filtration, clear.

The polycoesters according to the invention are highly suitable in the form of their aqueous, preferably neutral or approximately neutralized solutions for use as sizing agents, for example natural or synthetic spun yarns, but in particular for filament yarns from synthetic filaments. These yarns can be smooth or textured and be made of for example polyesters, polypropylene, polyacrylonitrile, nylon-6.6.

The polycoesters according to the invention are particularly suitable for use as sizing agents for spun yarns or in particular filament yarns made of polyester, in particular polyethylene terephthalate.

It was surprising that the sizing properties of the polycoesters prepared according to the invention could be improved still further compared with known sizing agents based on polyesters, in particular with respect to lower electrolyte sensitivity, lower application level, better film elasticity and better and easier washoff. Yarns sized with the polycoesters prepared according to the invention exhibit for example very good yarn cohesion and a high bending stiffness even in the case of a very low size addon; in weaving leave no tacky and only minimal dusty abrasion; form no or few bits of fluff, snarls and broken ends; and stick neither to one another nor to the weaving reed. They exhibit excellent running properties in weaving, associated with high weaving efficiencies. The sizing solutions do not form skin on standing in air and are freely dilutable with water. They are also stable to spin finishes which are already present on the yarns. It is advantageous that the sizes according to the invention do not foam. The sizing agents adhere well to the substrates, but after weaving they can be removed from the sized yarns without leaving a residue by a simple wash.

The concentration of the polycoesters prepared according to the invention in the aqueous size solutions is 4 to 10 percent by weight. Depending on the amount of sizing solution retained by the yarn, drying leaves sizing agent addons of between 1 and 6% by weight, based on weight of yarn.

In general the concentration of the size solution and the amount absorbed by the yarn are coordinated in such a way that smooth filament yarns absorb 1.5 to 4.5, preferably 2 to 3, percent by weight, of size and textured filament yarns 2 to 6, preferably 3 to 5, percent by weight.

After impregnation of the yarns with the size solutions, the yarns are dried at temperatures of 105° to 160° C. The film hardness of the size addon can be substantially varied by varying the starting materials. Increasing the isophthalic acid or neopentylglycol content renders the size harder, while increasing the adipic acid or polyethylene glycol content renders the size softer.

The examples below serve to illustrate the invention in more detail. Percentages are by weight, unless otherwise stated.

The following abbreviations are used in the examples:
SIM = sodium salt of dimethyl 5-sulfoisophthalate
SIA = monosodium salt of 5-sulfoisophthalic acid
SPO = sodium salt of dimethyl 5-sulfopropoxyisophthalate
STM = sodium salt of dimethyl 2-sulfoterephthalate
IPA = 99% strength isophthalic acid
DMI = dimethyl isophthalate
ADS = adipic acid
ADSM = dimethyl adipate
DEG = diethylene glycol
TEG = triethylene glycol
PEG = polyethylene glycol (the number at the end indicates the average molecular weight)
MEG = monoethylene glycol
NEO = neopentylglycol = 2,2'-dimethylpropane-1,3-diol
TIP = titanium tetraisopropylate
TIB = titanium tetrabutylate

EXAMPLE 1

(17.5 mol % of SIM, 67.5% mol % of IPA, 15 mol % of ADS, 180 mol % of MEG, 20 mol % of NEO, 5 mol % of PEG 300, 5 mol % of PEG 600)

In a 2-liter ground joint four-necked flask with stirrer, thermometer, gas inlet tube for nitrogen, Vigreux column and descending condenser on the Vigreux column, 223.3 g of MEG (=3.6 mol), 30 g of PEG (=0.1 mol), 60 g of molten PEG 600 (=0.1 mol) and 2.4 g of a 5% strength solution of TIPR in isopropanol are thoroughly stirred, and 41.6 g of NEO (=0.4 mol), 103.6 g of SIM (=0.35 mol) and 0.5 g of sodium methylate are then mixed in.

The apparatus is evacuated and filled with nitrogen. While stirring and passing over a moderate stream of nitrogen, the internal temperature is raised to 175° C. in 45 min and in a further 45 min to 190° C., during which about 18 g of methanol are collected in the receiver.

224.1 g of IPA (=1.35 mol) and 43.8 g of ADS (=0.3 mol) are then added, and the heating schedule is then as follows: in 1 h up to 210° C., in 1 h up to 220° C., in 1 h up to 230° C., 1 h at 230° C. The distillate in this phase consists predominantly of water of condensation. The Vigreux column is then removed, 0.1 g of $Sb_2O_3$ is added, and the column is replaced by a descending condenser. The condensation temperature is then raised to 280° C. in 45 min and is maintained at 280° to 285° C. for 30 min. A vacuum is then applied and the condensation is continued for 30 min under a vacuum down to about 20 mbar and for a further 30 min under a vacuum down to about 2 mbar. The distillate in this phase predominantly consists of ethylene glycol.

The result obtained is 511 g of a pale melt, which is converted with softened water and a little 1N sodium hydroxide solution to 1703 g of a 30% strength, neutral, usually clear solution. If the solution obtained is turbid or becomes turbid later, it can easily be clarified without residue by stirring with 1 to 2% of a suitable filter aid, for example kieselguhr or Celite J2, and forcing through a suction filter.

The polycoester obtained has the following parameters:
flow point: 230° to 235° C.
average molecular weight: 16000.

The flow point is determined as follows: a 3 mm×3 mm×0.05 mm sized sample of the polyester film is placed between two cover slips and slowly heated up on a Kofler heating stage, while a wooden toothpick or matchstick is used to shift the upper cover slip by hand. The temperature at which the upper cover slip can be shifted is the flow point.

EXAMPLE 2

If in Example 1 instead of 15 mol % of ADS only 14.6 g=5 mol % are used and in return the amount of IPA is raised from 67.5 mol % to 77.5 mol %=257.3 g, an otherwise identical procedure gives a polycoester which produces harder size.

The polycoester obtained has the following parameters:
flow point: 235° to 240° C.
average molecular weight: 22400.

EXAMPLE 3

(17.5 mol % of STM, 15 mol % of ADS, 67.5 mol % of IPA, 150 mol % of MEG, 20 mol % of NEO, 11 mol % of PEG 400)

In the same stage as described in Example 1, 186 g of MEG (=3 mol), 80 g of PEG 400 (=0.22 mol) and 2.4 g of a 5% strength solution of TIPR in methanol are thoroughly stirred, and 41.6 g of NEO (=0.4 mol), 103.6 g of STM (=0.35 mol) and 1 g of sodium acetate are mixed in.

The apparatus is evacuated and filled with nitrogen. While stirring and passing over a moderate stream of nitrogen, the internal temperature is raised to 175° C. in 45 min and in a further 45 min to 190° C., during which about 18 g of methanol are collected in the receiver. 224.1 g of IPA (=1.35 mol) and 43.8 g of ADS (=0.3 mol) are then added, and the heating schedule is then as follows: in 1 h up to 210° C., in 1 h up to 220° C., in 1 h up to 230° C., 1 h at 230° C. The distillate in this phase consists predominantly of water of condensation. The Vigreux column is then removed and the descending condenser is placed directly on the corresponding joint of the four-necked flask. The condensation temperature is then raised to 280° C. in 45 min and is maintained at 280° to 285° C. for 30 min. A vacuum is then applied and the condensation is continued for 30 min under a vacuum down to about 20 mbar and for a further 30 min under a vacuum down to about 2 mbar. The distillate in this phase predominantly consists of ethylene glycol.

The result obtained is 506 g of a pale melt, which is converted with softened water and a little 1N sodium hydroxide solution to 1687 g of a 30% strength, neutral, usually clear solution. If the solution obtained is turbid or becomes turbid later, it can easily be clarified without residue by stirring with 1 to 2% of a suitable filter aid, for example kieselguhr or Celite J2, and filtration through a suction filter.

The polyester obtained has the following parameters:
flow point: 245° to 250° C.
average molecular weight: 28300.

EXAMPLE 4

(12.5 mol % of SIA, 75 mol % of IPA, 12.5 mol % of ADS, 170 mol % of MEG, 20 mol % of NEO, 10 mol % of PEG 300)

In the same apparatus as described in Example 1, 210.8 g of MEG (=3.4 mol), 60 g of PEG 300 (=0.2 mol) and 2.4 g of a 5% strength TIPR solution in methanol are briefly stirred, and 66 g of SIA (=0.25 mol), 41.6 g of NEO (=0.4 mol), 249 g of IPA (1.5 mol), 36.5 g of ADS (=0.25 mol) and 2 g of sodium acetate are mixed in.

The apparatus is evacuated and filled with nitrogen. With stirring and passing over of nitrogen the temperature is then raised to 170° C. in the course of 45 min and to 195° C. in the course of a further 45 min. The reaction temperature is raised to 210° C. in 1 h and to 220° C. in a further h. Between 170° and 220° C. almost 100 g of distillate, predominantly water, are collected in the receiver. The temperature is then raised to 230° C. in a further hour and then kept at 230° to 235° C. for 4 h. The Vigreux column is then removed, 0.1 g of $Sb_2O_3$ is added, and the descending condenser is then placed directly on the corresponding joint of the four-neck flask.

A vacuum is then applied and heating is continued at 230° to 235° C. for 4 h under 10 to 20 mbar. The temperature is raised to 270° C., and the condensation is continued at 270° to 275° C. and 1 to 4 mbar for a further 2 h. In this phase about 87 g of distillate, predominantly ethylene glycol, are collected in the receiver.

The result obtained is 446 g of a pale melt, which is diluted with 1038 g of distilled water and 3 ml of 1N sodium hydroxide solution to 1483 g of a pale, 30% strength, usually turbid solution having a pH value of about 6.5. The solution is expediently stirred with 1 to 2% of a suitable filter aid, for example Perlite filter aid, and forced through a suction filter. In this way a water-clear solution is obtained.

The polycoester obtained has the following parameters:
flow point: 240° to 250° C.
average molecular weight: 20200.

EXAMPLE 5

If in Example 4 instead of 12.5 mol % of ADS 58.4 g=20 mol % are used and in return the amount of IPA is reduced from 75 to 67.5 mol %=224.1 g, an otherwise identical procedure gives a polyester with produces a softer size.

The polycoester obtained has the following parameters:
flow point: 230° to 235° C.
average molecular weight: 18800.

EXAMPLE 6

(12.5 mol % of SIM, 75 mol % of IPA, 12.5 mol % of ADSM, 140 mol % of MEG, 20 mol % of NEO, 10 mol % of PEG 300)

In the same apparatus as described in Example 1, 173.6 g of MEG (=2.8 mol), 60 g of PEG 300 (=0.2 mol) and 1 g of TIPR are briefly stirred, and 43.5 g of ADSM (=0.25 mol), 74 g of SIM (=0.25 mol), 41.6 g of NEO (=0.4 mol) and 2 g of potassium tert.-butylate are then mixed in. The apparatus is evacuated and filled with nitrogen. With stirring and passing over of a moderate stream of nitrogen the reaction temperature is then raised to 170° C. in the course of 45 min and to 195° C. in the course of a further 45 min, during which about 25 g of methanol are collected in the receiver. 249 g of IPA (=1.5 mol) are added, and the temperature is then raised to 210° C. in the course of an hour and is maintained at 210 to 215° C. for 4 h. In this phase the distillate consists predominantly of water of condensation. The Vigreux column is then removed and replaced by a descending condenser, and a vacuum is applied. Initially the condensation is continued at 210° to 215° C.

and at 10 to 20 mbar for 4 h and then at 250° to 255° C. at 1 to 4 mbar for a further 4 h. In this last phase the distillate predominantly consists of ethylene glycol.

The result obtained is 470 g of a pale melt, which is diluted with 1092 g of softened water and about 4 ml of 1N sodium hydroxide solution to 1566 g of a 30% strength pale, but usually turbid, solution. The solution is therefore expediently clarified by stirring with 1 to 2% of a suitable filter aid, for example Perlite filter aid, and forcing through a suction filter.

The polycoester obtained has the following parameters:
flow point: 230° to 235° C.
average molecular weight: 16500.

EXAMPLE 7

(12.5 mol % of SIM, 75 mol % of IPA, 12.5 mol % of ADS, 150 mol % of MEG, 20 mol % of NEO, 10 mol % of PEG 300)

In the same apparatus as described in Example 1, 186.8 g of MEG (=3 mol), 60 g of PEG 300 (=0.2 mol) and 2.4 g of a 5% strength solution of TIPR in isopropanol are thoroughly stirred, and 41.6 g of NEO (=0.4 mol), 74 g of SIM (=0.25 mol) and 2 g of sodium acetate are then mixed in.

The apparatus is evacuated and filled with nitrogen. With stirring and passing over of a moderate stream of nitrogen the internal temperature is raised to 170° C. in 45 min and to 190° C. in a further 45 min, during which about 15 g of methanol are collected in the receiver.

249 g of IPA (=1.5 mol) and 36.5 g of ADS (=0.25 mol) are then added, and the following heating schedule is followed: to 210° C. in 1h, to 220° C. in 1 h, to 230° C. in 1 h, at 230° C. for 1 h. In this phase the distillate predominantly consists of water of condensation. The Vigreux column is then removed and replaced by a descending condenser. The condensation temperature is then raised to 280° C. in 45 min and is maintained at 280° to 285° C. for 30 min. A vacuum is then applied, and the condensation is continued under a vacuum down to about 20 mbar for 30 min and under a vacuum down to about 2 mbar for a further 30 min. The distillate in this phase predominantly consists of ethylene glycol.

The result obtained is 465 g of a pale melt, which is diluted with softened water and a little 1N sodium hydroxide solution to 1550 g of a 30% strength neutral, usually turbid solution. By stirring with 1 to 2% of a suitable filter aid, for example kieselguhr or Celite J2, and forcing through a suction filter, the solution can easily be clarified without residue.

The polycoester obtained has the following parameters:
flow point: 240° to 245° C.
average molecular weight: 34700.

EXAMPLE 8

(17.5 mol % of SIM, 67.5 mol % of IPA, 15 mol % of ADS, 170 mol % of MEG, 20 mol % of NEO, 5 mol % of PEG 300)

In the same apparatus as described in Example 1, 210.8 g of MEG (=3.4 mol), 30 g of PEG 300 (=0.1 mol) and 2.4 g of a 5% strength solution of TIPR in methanol are thoroughly stirred. 41.6 g of NEO (=0.4 mol), 103.6 g of SIM (=0.35 mol) and 1 g of sodium acetate are then mixed in.

The apparatus is evacuated and filled with nitrogen. With stirring and passing over of a moderate stream of nitrogen the internal temperature is then raised to 170° C. in 45 min and to 195° C. in a further 45 min, during which about 19 g of methanol are collected in the receiver.

224.1 g of IPA 99 (=1.35 mol) and 43.8 g of ADS (=0.3 mol) are then added, and the following heating schedule is followed: to 210° C. in 1 h, to 220° C. in 1 h, to 230° C. in 1 h, at 230° C. for 1 h. The distillate in this phase predominantly consists of water of condensation. The Vigreux column is then removed and replaced by a descending condenser. The condensation temperature is then raised to 280° C. in 45 min and maintained at 280° to 285° C. for 30 min. A vacuum is then applied and the condensation is continued under a vacuum down to about 20 mbar for 30 min and under a vacuum down to about 2 mbar for a further 30 min. The distillate in this phase predominantly consists of ethylene glycol.

The result obtained is 472 g of a pale melt, which is diluted with softened water and a little 1N NaOH to 1573 g of a 30% strength neutral turbid solution. If the solution obtained is turbid or becomes turbid later, it can easily be clarified without residue by stirring with 1 to 2% of a suitable filter aid, for example kieselguhr of Celite J2, and forcing through a suction filter.

The polycoester obtained has the following parameters:
flow point: about 265° C.
average molecular weight: 26900.

EXAMPLE 9

(12.5 mol % of SIM, 75 mol % of DMI, 12.5 mol % of ADSM, 170 mol % of MEG, 10 mol % of PEG 300)

In the same apparatus as described in Example 1, 210.8 g of MEG (=3.4 mol), 60 g of PEG 300 (=0.2 mol) and 1 g of TIPR are thoroughly mixed. 74 g of SIM (=0.25 mol), 2 91 g of DMI (=1.5 mol), 43.5 g of ADSM and 1.5 g of sodium acetate are then mixed in.

The apparatus is evacuated and filled with nitrogen. With stirring and passing over a moderate stream of nitrogen the internal temperature is then raised to 175° C. in the course of 45 min and to 190° C. in a further 45 min, during which about 95 g of methanol are collected in the receiver. The temperature is then raised to 210° C. in 1 h, to 220° C. in 1 h and to 230° C. for a further h and is finally maintained at 230° to 235° C. for 1 h. In this phase approximately a further 15 g of distillate are collected.

The Vigreux column is then removed, 0.2 g of phosphorous acid and 0.1 g of $Sb_2O_3$ are then added and the column is replaced by a descending condenser. The condensation temperature is then raised to 270° C. in 45 min and is maintained at 270° to 275° C. for 30 min. A vacuum is then applied, and the condensation is continued under a vacuum down to about 20 mbar for 30 min and under a vacuum down to about 2 mbar for a further 30 min. The distillate in this phase predominantly consists of ethylene glycol.

The result obtained is 465 g of a pale melt, which is diluted with softened water and a little 1N NaOH to 1550 g of a 30% strength, neutral, usually clear solution. If the solution is turbid or becomes turbid later, it can easily be clarified without residue by stirring with 1 to 2% of a suitable filter aid, for example kieselguhr or Celite J2, and forcing through a suction filter.

The polycoester obtained has the following parameters:
flow point: 235° to 245° C.,
average molecular weight: 22000.

EXAMPLE 10

A very similar product as in Example 9 is obtained when instead of 12.5 mol % of SIM, 12.5 mol % of SPO are used.

EXAMPLE 11

(12.5 mol % of SIM, 75 mol % of IPA, 12.5 mol % of ADSM, 140 mol % of MEG, 20 mol % of NEO, 3 mol % of DEG, 3 mol % of TEG, 5 mol % of PEG 600)

In the same apparatus as described in Example 1, 173.6 g of MEG (=2.8 mol), 6.36 g of DEG (=0.06 mol), 9 g of TEG (=0.06 mol), 60 g of PEG 600 (=0.1 mol) and 0.5 g of TIBU are briefly stirred, and 43.5 g of ADSM (=0.25 mol), 74 g of SIM (=0.25 mol), 41.6 g of NEO (=0.4 mol) and 2 g of potassium tert.-butylate are then mixed in. The apparatus is evacuated and filled with nitrogen. With stirring and passing over of a moderate stream of nitrogen, the reaction temperature is then raised to 170° C. in the course of 45 min and to 195° C. in the course of a further 45 min, during which about 25 g of methanol are collected in the receiver. 249 g of IPA (=1.5 mol) are added, and the temperature is raised to 210° C. in the course of 1 hour and is then maintained at 210° to 215° C. for 4 h. The distillate in this phase predominantly consists of water of condensation. The Vigreux column is then removed, 0.2 g of phosphorous acid is added, the column is replaced by a descending condenser, and a vacuum is applied. The condensation is continued initially at 210° to 215° C. for 4 h and under 10 to 20 mbar and then at 250 to 255° C. and 1 to 4 mbar for a further 4 h. The distillate in this last phase predominantly consists of ethylene glycol.

The result obtaihed is 481 g of a pale melt, which is diluted with 1096 g of softened water and about 4 ml of 1N sodium hydroxide solution to 1603 g of an approximately 30% strength pale, but usually turbid, solution. This solution is expediently therefore clarified by stirring with 1 to 2% of a suitable filter aid, for example Perlite filter aid, and forcing through a suction filter.

The polycoester obtained has the following parameters:

flow point: 230° to 235° C.,
average molecular weight: 15600.

EXAMPLE 12

The 30% strength aqueous polycoester solution prepared in Example 8 is diluted with softened water to a solids content of 4.5% and is used as follows as a sizing agent for a textured polyester yarn:

A 20-filament 76 dtex textured polyester yarn is passed on an open-width sizing machine at a rate of 60 m/min through the 4.5% strength aqueous warmed solution at 55° C. of the polyester prepared in Example 7, and is then squeezed off. The sheet of yarns is then passed over an aggregate of seven heating drums which have been set to a temperature of 120° C. (dwell time 20 seconds). The dried sheet of yarns then brushes over a roll which dips into a hot melt wax of PEG 6000 at 100° C. and is then beamed onto a warp beam. The total addon of sizing agent, wax and spin finish is 3.8%, of which the sizing agent accounts for 2.5 to 2.8%. The sized warp has good running properties on the weaving machine. Faults and abrasions are far below the prescribed limits.

EXAMPLE 13

(a) A single untwisted air-textured 50-dtex 20-filament polyester yarn is sized on a laboratory sizing machine analogously to the conditions on a large-scale sizing machine with the aqueous solution of a polyester size as per Example 8. The yarn speed is 40 m/min, and the temperature of the size bath is 60° C. The yarn is predried at 140° C. in the air duct, is then contact-dried at 100° C. over two heated godets, is tested for bending stiffness and yarn cohesion and is subjected to an abrasion test involving a moving sewing needle.

To determine the bending stiffness, the torque is measured of a balance arm whose one end rests on the ends of a 10 yarn sheet which project 4 mm out of a clamp and whose other end is provided with a rider. The rider is moved along until the yarn sheet gives way and the arm tips over. The variable measured is the distance the rider has been shifted from the fulcrum of the balance arm. An average of 6 individual measurements is quoted.

To determine the yarn cohesion, a filament yarn is clamped in a yarn clamp and a 100 g weight is attached to the filament yarn at a point 50 cm below the clamping point. The filament yarn is then cut through with a pair of scissors at a point 20 cm below the clamping point. As a result of the sudden removal of the weight the filaments spread apart, unless more or less hindered from doing so by the size. The length of filament yarn which has not split open is determined in cm and quoted as yarn cohesion. An average of 10 individual measurements is quoted.

For the abrasion test with a moving sewing needle, the sized yarn was passed with a yarn speed of 45 m/h through the eye of a Pfaff 100 sewing needle which was moving up and down through an amplitude of 24 mm at a frequency of 750 cycles/min, and the abrasion after a running time of 3 min was measured in mg.

(b) Under the same conditions as in Example 13 (a), a single untwisted air-textured 50-dtex polyester filament yarn, is sized with a commercial polyester size comprising 90 mol % of isophthalic acid, 10 mol % of sulfoisophthalic acid and 100 mol % of diethylene glycol at various concentrations of the size solution, and the running behavior of the sized yarns is tested.

The test results on the yarns sized in accordance with Examples 13(a) and 13(b) are contrasted in the table below:

|  | Bending stiffness cm | Yarn cohesion cm | Abrasion mg |
| --- | --- | --- | --- |
| Example 13a: | 27.5 | 16.6 | 0.9 |
| Example 13b: | 24.8 | 16.4 | 1.1 |

EXAMPLE 14

(a) A single 50-dtex 20-filament polyester yarn is sized in accordance with Example 13(a) on a laboratory sizing machine with a polyester size which contains the polyester prepared in Example 8. The total addon is 2.3%.

In the tests, virtually no abrasion is found on the sewing needle and the deflecting elements, and the yarn has satisfactory running properties.

(b) For comparison the yarn is treated with a sizing agent which consists of a copolymer (main components polyvinyl alcohol 60%, polyvinyl acetate 25%, alkanesulfonate 5%). The total addon is 3.5%. The abrasion test soon reveals pronounced fluffing which presently leads to yarn breakage.

(c) A single 50-dtex 20-filament polyester yarn is treated on a laboratory sizing machine with a known polyester size comprising 90 mol % of isophthalic acid, 10 mol % of sulfoisophthalic acid and 100 mol % of diethylene glycol. The total addon is 2.3%. The running properties for weaving are unsatisfactory. The abrasion test reveals poor yarn cohesion and numerous bits of fluff which presently lead to broken ends.

We claim:

1. A polycoester having a flow point between 220° and 280° C. of the general formula I

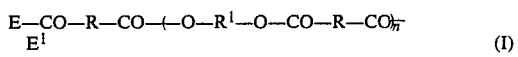

(I)

in which

R is on average 60 to 85 mol % 1,3-phenylene radicals, 5 to 20 mol % tetramethylene radicals and 10 to 20 mol % radicals of the formula IIa and/or IIb

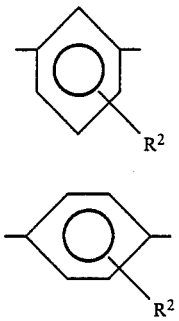

$R^1$ is on average 60 to 95 mol % ethylene radicals (—$CH_2CH_2$—), 0 to 28 mol % 2,2-dimethyl-1,3-propylene radicals and 5 to 12 mol % polyoxyethylene radicals having an average molecular weight up to 600 and $R^2$=$SO_3M$ or —$OCH_2CH_2CH_2SO_3M$, E, $E^1$=—OM, alkoxy having 1 to 4 C atoms or the radical —O—$R^1$—OH, M denotes a proton, an alkali metal cation or an ammonium ion and n is a sufficiently large number that the polycoester has an average molecular weight between 15,000 and 40,000.

2. Polycoester as claimed in claim 1, wherein R is on average 60 to 80 mol % 1,3-phenylene radicals, 10 to 20 mol % tetramethylene radicals and 10 to 20 mol % radicals of the formula IIa.

3. Polycoester as claimed in claim 1 and/or 2 wherein $R^1$ is on average 68 to 90 mol % ethylene radicals (—$CH_2$—$CH_2$—), 5 to 20 mol % 2,2-dimethyl-1,3-propylene radicals and 5 to 10 mol % polyoxyethylene radicals having an average molecular weight of 600.

4. Polycoester as claimed in one or more of claims 1 to 3, wherein its molecular weight is between 20,000 and 40,000.

5. Polycoester as claimed in one or more of claims 1 to 4, wherein its flow point is between 230° and 270° C.

6. Process for preparing the polycoester of one or more of claims 1 to 5, which comprises esterifying of transesterifying 100 mol % a dicarboxylic acid component comprising 60 to 85 mol % isophthalic acid and/or its lower alkyl esters and 5 to 20 mol % adipic acid and/or its lower alkyl esters and 10 to 20 mol % an acid of the formula Va and/or Vb

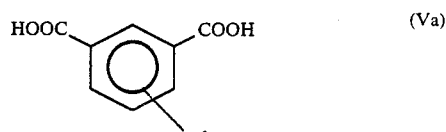

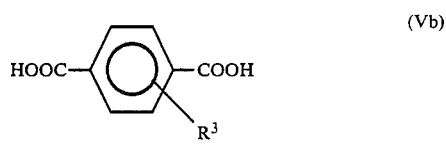

in which $R^3$=$SO_3M^1$ or —$OCH_2CH_2CH_2SO_3M^1$ and $M^1$ denotes an alkali metal cation and/or its lower alkyl ester with (based on 100 mol % the dicarboxylic acid component) 120 to 265 mol % a diol component comprising 115 to 225 mol % ethylene glycol, 0 to 28 mol % neopentyl glkycol and 5 to 12 mol % one or more polyethylene glycols of the formula IV

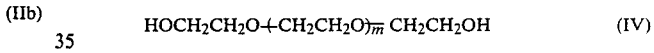

where m is a number from 0 to 12, at temperatures up to 235° C. and then polycondensing at temperatures up to 300° C. until the polycoester formed has an average molecular weight between 15,000 and 40,000.

7. Process as claimed in claim 6, wherein the polycondensation is continued until the polycoester formed has an average molecular weight between 20,000 and 40,000.

8. Process as claimed in claim 6 and/or 7, wherein 100 mol % a dicarboxylic acid component which is 60 to 80 mol % isophthalic acid and/or its lower alkyl esters, 10 to 20 mol % adipic acid and/or its lower alkyl esters and 10 to 20 mol % an acid of the formula Va and/or its lower alkyl esters are used.

9. Process as claimed in one or more of claims 6 to 8, wherein 140 to 230 mol % a diol component comprising 130 to 190 mol % ethylene glycol, 5 to 20 mol % neopentylglycol and 5 to 10 mol % polyethylene glycol of the formula IV are used per 100 mol % the dicarboxylic acid.

10. Process as claimed in one or more of claims 6 to 9, wherein the esterification or transesterification is carried out at temperatures of 170° to 200° C. and the condensation at adjoining upper temperatures up to 285° C.

11. Use of a polycoester of one or more of claims 1 to 5 as a sizing agent.

* * * * *